United States Patent
Gandhi et al.

(10) Patent No.: US 11,603,903 B2
(45) Date of Patent: Mar. 14, 2023

(54) VIBRATION ISOLATION FOR ROTATING MACHINES

(71) Applicant: Toyota Motor Engineering & Manufacturing North America, Inc., Plano, TX (US)

(72) Inventors: Umesh N. Gandhi, Farmington Hills, MI (US); Paul A. Gilmore, Ann Arbor, MI (US); Ryohei Tsuruta, Ann Arbor, MI (US); Brian J. Pinkelman, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 56 days.

(21) Appl. No.: 17/156,135

(22) Filed: Jan. 22, 2021

(65) Prior Publication Data
US 2022/0196109 A1    Jun. 23, 2022

Related U.S. Application Data

(60) Provisional application No. 63/128,519, filed on Dec. 21, 2020.

(51) Int. Cl.
*F16F 15/08* (2006.01)
*H02K 5/26* (2006.01)
(Continued)

(52) U.S. Cl.
CPC .............. *F16F 15/08* (2013.01); *F01D 25/04* (2013.01); *F01D 25/24* (2013.01); *H02K 5/26* (2013.01);
(Continued)

(58) Field of Classification Search
CPC ........ F01D 25/24; F01D 25/04; F01D 25/164; F01D 5/10; F01D 5/16; F01D 5/26;
(Continued)

(56) References Cited

U.S. PATENT DOCUMENTS

| | | |
|---|---|---|
| 82,276 A | 9/1868 | Bellerille |
| 1,826,597 A | 10/1931 | Brecht |

(Continued)

FOREIGN PATENT DOCUMENTS

| | | |
|---|---|---|
| CN | 202811955 | 3/2013 |
| CN | 104062461 A | 9/2014 |

(Continued)

OTHER PUBLICATIONS

Williams et al., "Dynamic modelling of a shape memory alloy adaptive tuned vibration absorber," Journal of Sound and Vibration 280, Dec. 4, 2003, pp. 211-234 (24 pages).

Araki et al., "Integrated mechanical and material design of quasi-zero stiffness vibration isolator with superelastic Cu—Al—Mn shape memory alloy bars," Journal of Sound and Vibration, Dec. 2015, pp. 1-19 (34 pages).

(Continued)

*Primary Examiner* — Igor Kershteyn
(74) *Attorney, Agent, or Firm* — Christopher G. Darrow; Darrow Mustafa PC

(57) ABSTRACT

A rotating machine system can include a rotating machine. The rotating machine system can include a housing. The housing can include an inner surface. The housing can surround at least a portion of the rotating machine. The inner surface of the housing can be spaced from the rotating machine such that a space is defined therebetween. The rotating machine system can include one or more super elastic wires. The one or more super elastic wires can be positioned in the space and can be operatively connected to the rotating machine and the inner surface of the housing.

(Continued)

The one or more super elastic wires can reduce vibration within the rotating machine system.

20 Claims, 4 Drawing Sheets

(51) Int. Cl.
  *F01D 25/04* (2006.01)
  *F01D 25/24* (2006.01)
(52) U.S. Cl.
  CPC ...... *F05D 2220/30* (2013.01); *F05D 2260/96* (2013.01)
(58) Field of Classification Search
  CPC ........ F16F 15/08; H02K 5/26; F05D 2220/30; F05D 2260/96
  See application file for complete search history.

(56) References Cited

U.S. PATENT DOCUMENTS

| | | | |
|---|---|---|---|
| 2,121,835 A | 6/1938 | Sproul | |
| 2,655,935 A | 10/1953 | Kinzbach | |
| 2,991,655 A | 7/1961 | Jorgensen | |
| 3,394,631 A | 7/1968 | Thompson | |
| 3,430,942 A | 3/1969 | MacGlashan | |
| 3,559,512 A | 2/1971 | Aggarwal | |
| 3,574,347 A | 4/1971 | Hughes | |
| 3,608,883 A | 9/1971 | Russold | |
| 3,743,266 A | 7/1973 | Sturman et al. | |
| 3,836,195 A | 9/1974 | Teeri | |
| 3,856,242 A | 12/1974 | Cook | |
| 3,858,665 A | 1/1975 | Winkler | |
| 3,873,079 A | 3/1975 | Kuus | |
| 3,980,016 A | 9/1976 | Taylor | |
| 4,168,101 A | 9/1979 | DiGrande | |
| 4,215,841 A | 8/1980 | Herring, Jr. | |
| 4,351,556 A | 9/1982 | Worringer | |
| 4,457,213 A | 7/1984 | Morgan | |
| 4,522,447 A | 6/1985 | Snyder et al. | |
| 4,530,491 A | 7/1985 | Bucksbee et al. | |
| 4,612,429 A | 9/1986 | Milianowicz | |
| 4,824,338 A | 4/1989 | Eickmann | |
| 4,799,654 A | 6/1989 | Eickmann | |
| 4,898,426 A | 2/1990 | Schulz et al. | |
| 5,178,357 A | 1/1993 | Platus | |
| 5,222,709 A | 6/1993 | Culley, Jr. et al. | |
| 5,263,694 A | 11/1993 | Smith et al. | |
| 5,310,157 A | 5/1994 | Platus | |
| 5,390,903 A | 2/1995 | Fidziukiewicz | |
| 5,482,351 A | 1/1996 | Young et al. | |
| 5,662,376 A | 9/1997 | Breuer et al. | |
| 5,669,594 A | 9/1997 | Platus | |
| 5,669,598 A | 9/1997 | Ticey et al. | |
| 5,747,140 A | 5/1998 | Heerklotz | |
| 5,842,312 A | 12/1998 | Krumme et al. | |
| 6,025,080 A | 2/2000 | Soroushian | |
| 6,142,563 A | 11/2000 | Townsend et al. | |
| 6,290,037 B1* | 9/2001 | Williams ................ F16F 7/116 188/379 |
| 6,354,556 B1 | 3/2002 | Ritchie et al. | |
| 6,796,408 B2* | 9/2004 | Sherwin ................ F16F 15/04 188/378 |
| 6,896,324 B1 | 5/2005 | Kull et al. | |
| 6,935,693 B2 | 8/2005 | Janscha | |
| 6,939,097 B2 | 9/2005 | Carr et al. | |
| 7,100,990 B2 | 9/2006 | Kimura et al. | |
| 7,152,839 B2 | 12/2006 | Mullinix et al. | |
| 7,411,331 B2 | 8/2008 | Dubowski et al. | |
| 7,506,937 B2 | 3/2009 | Bequet | |
| 7,661,764 B2 | 2/2010 | Ali et al. | |
| 7,703,281 B2 | 4/2010 | Kosaka et al. | |
| 7,717,520 B2 | 5/2010 | Boren et al. | |
| 7,822,522 B2 | 10/2010 | Wereley et al. | |
| 7,971,939 B2 | 7/2011 | Fujita et al. | |
| 8,166,626 B2 | 5/2012 | Sereni et al. | |
| 8,185,988 B2 | 5/2012 | Wieland | |
| 8,328,962 B2 | 12/2012 | Schussler | |
| 8,366,082 B2 | 2/2013 | Evans | |
| 8,585,026 B2 | 11/2013 | Dittmar | |
| 8,793,821 B2 | 8/2014 | Fowkes et al. | |
| 8,899,393 B2 | 12/2014 | Kraner et al. | |
| 8,919,751 B2 | 12/2014 | Kneidel | |
| 9,154,024 B2 | 10/2015 | Jore et al. | |
| 9,194,452 B2 | 11/2015 | Hawkins et al. | |
| 9,327,847 B2 | 5/2016 | Platus | |
| 9,370,982 B2 | 6/2016 | Siuissa | |
| 9,394,950 B1 | 7/2016 | Henry et al. | |
| 9,399,320 B2 | 7/2016 | Johnson et al. | |
| 9,408,428 B2 | 8/2016 | Gaudet | |
| 9,447,839 B2 | 9/2016 | Dunning | |
| 9,731,828 B2 | 8/2017 | Lichota | |
| 9,791,014 B1 | 10/2017 | McKnight et al. | |
| 9,920,793 B1 | 3/2018 | Churchill et al. | |
| 9,994,136 B2 | 6/2018 | Nakada | |
| 10,233,991 B2 | 3/2019 | Churchill et al. | |
| 10,357,955 B2 | 7/2019 | Ziolek | |
| 10,371,229 B2 | 8/2019 | Gandhi et al. | |
| 10,479,246 B2 | 11/2019 | Meingast et al. | |
| 10,677,310 B2 | 6/2020 | Gandhi et al. | |
| 11,021,998 B2* | 6/2021 | Ganiger ................ F16C 27/066 |
| 2004/0145230 A1 | 7/2004 | Snyder et al. | |
| 2004/0245830 A1 | 12/2004 | Scheck et al. | |
| 2006/0101803 A1* | 5/2006 | White ........................ F02K 1/44 60/262 |
| 2006/0101807 A1* | 5/2006 | Wood .................... B64D 33/06 60/262 |
| 2007/0138720 A1 | 6/2007 | Evans | |
| 2007/0236071 A1 | 10/2007 | Fujita et al. | |
| 2008/0181763 A1* | 7/2008 | Webster ................ F01D 21/045 415/142 |
| 2009/0025833 A1 | 1/2009 | Schussler | |
| 2009/0126288 A1* | 5/2009 | Fanucci ................ E04H 9/0237 524/440 |
| 2010/0001568 A1 | 1/2010 | Trybus et al. | |
| 2010/0283887 A1 | 11/2010 | Topliss et al. | |
| 2012/0018577 A1 | 1/2012 | Quiroz-Hernandez | |
| 2014/0265468 A1 | 9/2014 | Greenhill et al. | |
| 2015/0130220 A1 | 5/2015 | Preisler et al. | |
| 2015/0298580 A1 | 10/2015 | Kanai | |
| 2015/0346507 A1 | 12/2015 | Howarth | |
| 2016/0009156 A1 | 1/2016 | Leonard et al. | |
| 2016/0032997 A1 | 2/2016 | Seepersad et al. | |
| 2016/0068085 A1 | 3/2016 | Mindel et al. | |
| 2017/0009601 A1* | 1/2017 | Szwedowicz ............ F01D 5/16 |
| 2017/0158104 A1 | 6/2017 | Le et al. | |
| 2018/0195570 A1 | 7/2018 | Churchill et al. | |
| 2018/0195571 A1 | 7/2018 | Churchill et al. | |
| 2018/0312086 A1 | 11/2018 | Meigast et al. | |
| 2019/0186588 A1 | 6/2019 | Gandhi et al. | |
| 2019/0186589 A1 | 6/2019 | Gandhi et al. | |
| 2021/0107623 A1* | 4/2021 | Barrett .................... F01D 25/04 |

FOREIGN PATENT DOCUMENTS

| | | | | |
|---|---|---|---|---|
| CN | 204774820 U | 11/2015 | | |
| CN | 103147511 B | 4/2016 | | |
| CN | 108240415 A | 7/2018 | | |
| CN | 108757799 A | 11/2018 | | |
| CN | 109540493 A | 3/2019 | | |
| CN | 109932805 A | 6/2019 | | |
| DE | 102010003594 A1 * | 10/2011 | ........... F01D 11/005 |
| JP | H0614980 U | 2/1994 | | |
| JP | 2011201378 | 10/2011 | | |
| WO | 2014180009 A1 | 11/2014 | | |

OTHER PUBLICATIONS

Casciati et al., "Performance of a base isolator with shape memory alloy bars," Earthquake Engineering and Engineering Vibration, vol. 6, No. 4, Dec. 2007, pp. 401-408 (8 pages).

(56) References Cited

OTHER PUBLICATIONS

Morsch et al., "Design of a Generic Zero Stiffness Compliant Joint," Proceedings of the ASME 2010 International Design Engineering Technical Conferences & Computers and Information in Engineering Conference, Aug. 15-18, 2010, pp. 1-9 (10 pages).

Miga Motor Company, "Miga Adrenaline—A Space Age Wire," retrieved from the Internet: <https://migamotors.com/index.php?main_page=product_info&cPath=1&products_id=37>, [retrieved Mar. 26, 2021] (1 page).

Furukawa Techno Material, "Shape Memory Alloys & Super-elastic Alloys," retrieved from the Internet: <https://www.furukawa-ftm.com/english/nt-e/product.htm>, [retrieved Mar. 26, 2021] (3 pages).

Le et al., "A vibration isolation system in low frequency excitation region using negative stiffness structure for vehicle seat," Journal of Sound and Vibration, vol. 330, Issue 26, Dec. 19, 2011, pp. 6311-6335 (25 pages).

Lee et al., "A multi-stage high-speed railroad vibration isolation system with "negative" stiffness," Journal of Sound and Vibration, vol. 331, Issue 4, Feb. 13, 2012, pp. 914-921 (8 pages).

Lee et al., "Position control of seat suspension with minimum stiffness," Journal of Sound and Vibration, vol. 292, Issues 1-2, Apr. 25, 2006, pp. 435-442 (8 pages).

Carrella et al., "Demonstrator to show the effects of negative stiffness on the natural frequency of a simple oscillator," Proceedings of the Institution of Mechanical Engineers, Part C: Journal of Mechanical Engineering Science, Jul. 14, 2008, pp. 1189-1192 (4 pages).

Le et al., "Experimental investigation of a vibration isolation system using negative stiffness structure," International Journal of Mechanical Sciences, vol. 70, May 2013, pp. 99-112 (14 pages).

Shan et al., "Rigidity-tuning conductive elastomer," Smart Materials and Structures, 2015, pp. 1-9 (10 pages).

Correa et al., "Mechanical design of negative stiffness honeycomb materials," Integrating Materials and Manufacturing Innovation, 2015, pp. 1-11 (11 pages).

Ferguson-Pell, "Seat Cushion Selection," JRRD Clinical Supplement No. 2: Choosing a Wheelchair System, 1990, pp. 49-73 (25 pages).

* cited by examiner

VIBRATION ISOLATION FOR ROTATING MACHINES

CROSS-REFERENCE TO RELATED APPLICATIONS

This application claims the benefit of U.S. Provisional Application No. 63/128,519, filed on Dec. 21, 2020, which is incorporated herein by reference in its entirety.

FIELD

The subject matter described herein relates in general to rotating machines and, more particularly, to vibration reduction in rotating machines.

BACKGROUND

Rotating machines are used for converting one type of energy input into a different type of energy output. Rotating machines are used in various applications, such as rotating vehicle wheels, generating energy from natural resources, and powering everyday appliances. Examples of rotating machines include motors and turbines.

SUMMARY

In one respect, the present disclosure is directed to a rotating machine system. The rotating machine system can include a rotating machine. The rotating machine system can include a housing. The housing can include an inner surface. The housing can surround at least a portion of the rotating machine. The inner surface of the housing can be spaced from the rotating machine such that a space is defined therebetween. The rotating machine system can include one or more super elastic wires. The one or more super elastic wires can be positioned in the space and can be operatively connected to the rotating machine and to the inner surface of the housing.

In another respect, the present disclosure is directed to a rotating machine system. The rotating machine system can include a rotating machine. The rotating machine system can include a housing. The housing can include an inner surface. The housing can surround at least a portion of the rotating machine. The inner surface of the housing can be spaced from the rotating machine such that a space is defined therebetween. The rotating machine system can include one or more super elastic wires. The one or more super elastic wires can be positioned in the space and can be operatively connected in tension to the rotating machine and to the inner surface of the housing. The one or more super elastic wires can be stretched to a quasi-zero stiffness regime.

DETAILED DESCRIPTION

Figure 1:
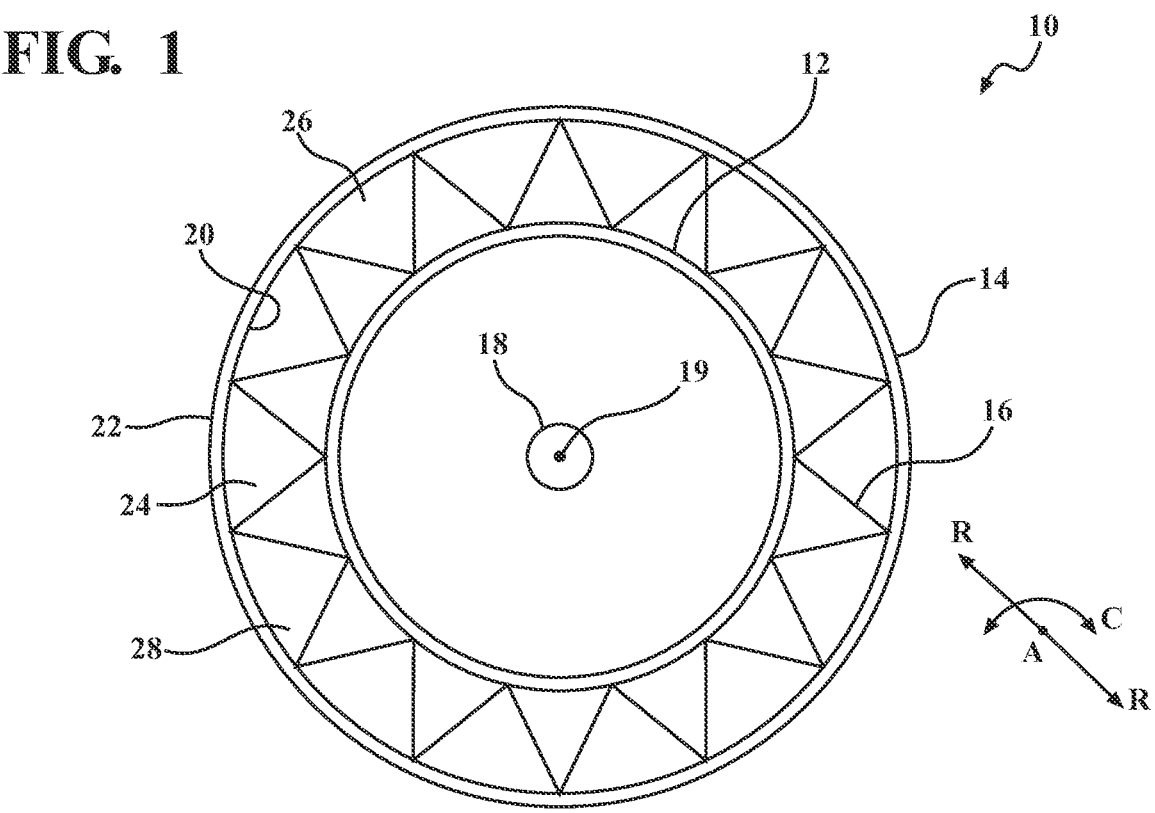
FIG. 1 is an example of at least a portion of a rotating machine system.

The high speed rotation of a rotating machine can cause the components of the rotating machine to vibrate. Other causes of vibration in rotating machines can include wear and tear on and/or misalignment of the components of the rotating machine, and/or bearing malfunctions, to name a few examples. Over time, vibration in rotating machines can cause mechanical failures within the rotating machine. Accordingly, arrangements described herein relate to vibration isolation for rotating machines.

A rotating machine system can include a rotating machine and a housing. The housing can include an inner surface, and the housing can surround at least a portion of the rotating machine. The inner surface of the housing can be spaced from the rotating machine such that a space is defined therebetween. The rotating machine system can include one or more super elastic wires positioned in the space and operatively connected to the rotating machine and to the inner surface of the housing. The one or more super elastic wires can reduce vibration in the rotating machine system.

Detailed embodiments are disclosed herein; however, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-7, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

Referring to FIG. 1, an example of at least a portion of a rotating machine system 10 is shown. Some of the possible elements of the rotating machine system 10 are shown in FIG. 1 and will now be described. It will be understood that it is not necessary for the rotating machine system 10 to have all of the elements shown in FIG. 1 or described herein. Further, it will be appreciated that the rotating machine system 10 can have alternative and/or additional elements to those shown in FIG. 1.

The rotating machine system 10 can include a rotating machine 12, a housing 14, and one or more super elastic wires 16. The various elements of the rotating machine system 10 can be operatively connected to each other (or any combination thereof). As used herein, the term "operatively connected" can include direct or indirect connections, including connections without direct physical contact.

Each of the above noted elements of the rotating machine system 10 will be described in turn below. The rotating machine 12 can be any suitable rotating machine, including a motor, a turbine, or a generator, just to name a few examples. The rotating machine 12 can include one or more stationary components and one or more rotating components. In some arrangements, the rotating machine 12 can include a stator, rotor, and/or central shaft 18. The rotating machine 12 can be configured to rotate at a high rate. The rotating machine 12 can have an axis of rotation 19.

The rotating machine system 10 can include a housing 14. At least a portion of the rotating machine 12 can be located within the housing 14, which can protect the rotating machine 12 or one or more components thereof. The housing 14 can include an inner surface 20 and an outer surface 22. In some arrangements, the housing 14 can be substantially cylindrical in shape, but the housing 14 can be any other suitable shape. In some arrangements, the inner surface 20 can be substantially cylindrical in shape, but other suitable shapes for the inner surface 20 are possible.

The inner surface 20 can surround at least a portion of the rotating machine 12. The housing 14 can be spaced from the rotating machine 12 such that there is a space 24 between the rotating machine 12 and the inner surface 20. The space 24 can include an upper region 26 and a lower region 28. The terms "upper" and "lower" are used for convenience to indicate the relative location of the region in the operative position of the rotating machine system 10. The space 24 can be substantially constant in one or more directions. For example, the space 24 can be substantially constant in the axial direction A, a circumferential direction C, and/or a radial direction R. The axial direction A can be a direction that is coaxial with and/or substantially parallel to the axis of rotation 19, which can be represented by point A in a direction into and/or out of the page. The circumferential direction C can be the direction about the axis of rotation 19. The radial direction R can be any direction extending substantially radially outward from the axial direction A toward the inner surface 20.

The rotating machine 12 can include one or more super elastic wires 16. The super elastic wire(s) 16 can be positioned in the space 24 between the rotating machine 12 and the inner surface 20. The super elastic wire(s) 16 can be operatively connected to the rotating machine 12 and to the inner surface 20.

The super elastic wire(s) 16 can be operatively connected to the rotating machine 12 and to the inner surface 20 in any suitable manner. For example, the super elastic wire(s) 16 can be operatively connected to the rotating machine 12 and/or to the inner surface 20 by one or more fasteners, one or more adhesives, one or more forms of mechanical engagement, and/or any combination thereof.

Figure 2:
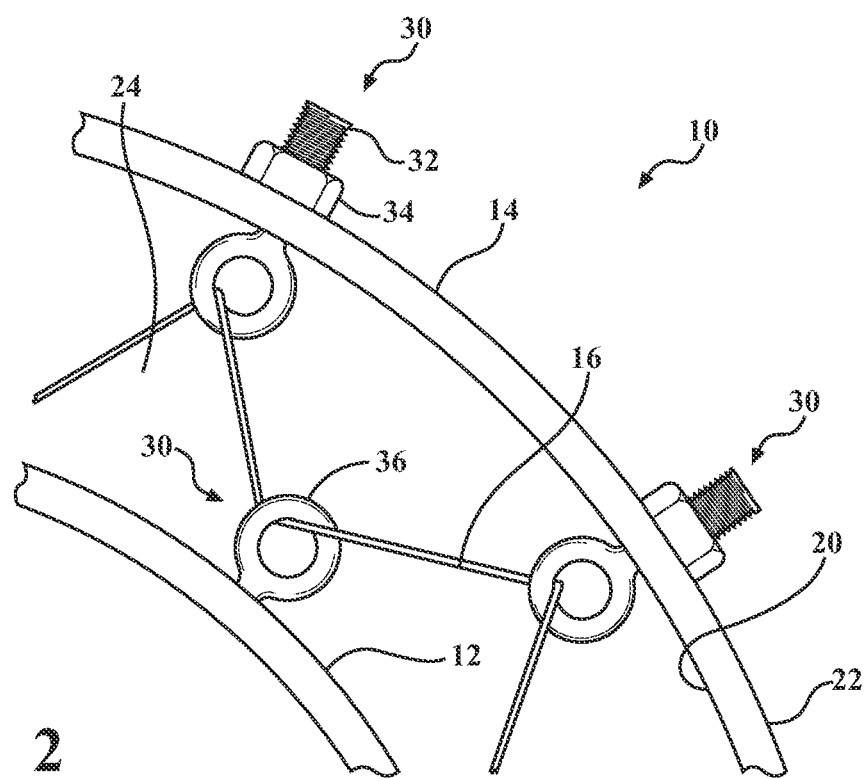
FIG. 2 is an example of a portion of the rotating machine system, showing an example of an operative connection of one or more super elastic wires to a rotating machine and to a housing.

Referring to FIG. 2, the rotating machine system 10 can, in one or more examples, include a plurality of fasteners 30 arranged in the circumferential direction C about the housing 14. In this example, the fasteners 30 can include bolts. In one example, the bolts can be eye bolts 32, but can be any other suitable type of bolt. The eye bolts 32 can pass through apertures in the housing 14. Retention members 34 can engage the eye bolts 32 on the outer surface 22 to retain the eye bolts 32 in place. In one example, the retention members 34 can be nuts, but can be any other suitable type of retention member.

Also shown in FIG. 2, the rotating machine system 10 can, additionally or alternatively, include fasteners 30 operatively connected to the rotating machine 12 and positioned within the space 24. The fasteners 30 can be any suitable fasteners, including hooks, loops, or rings 36. The super elastic wire(s) 16 can pass through the fasteners 30.

In other examples, the super elastic wire(s) 16 can be operatively connected to the rotating machine 12 and to the inner surface 20 directly. For example, the super elastic wire(s) 16 can be operatively connected to the rotating machine 12 and to the inner surface 20 by one or more screws, one or more nails, one or more adhesives, and/or one or more forms of mechanical engagement, or any combination thereof. As a result, the super elastic wire(s) 16 can directly contact the inner surface 20.

The super elastic wire(s) 16 can be positioned in the space 24 and operatively connected to the rotating machine 12 and to the inner surface 20 in any suitable arrangement. In one or more arrangements, such as is shown in FIG. 1, the rotating machine system 10 can include a single super elastic wire 16. The single super elastic wire 16 can be operatively connected to the rotating machine 12 and to the inner surface 20 at numerous points, thereby forming an alternating arrangement. In other arrangements, the rotating machine system 10 can include a plurality of super elastic wires 16. The plurality of super elastic wires 16 can be operatively connected to the rotating machine 12 and to the inner surface 20 at numerous points, thereby forming an alternating arrangement. In some arrangements, the super elastic wire(s) 16 can form or resemble a substantially zig-zag pattern. In other arrangements, the super elastic wire(s) 16 can substantially form or resemble a sine wave, a square wave, and/or a triangle wave, just to name a few examples. The super elastic wire(s) 16 can form any other suitable wave-like or alternating arrangement. In some arrangements, the super elastic wire(s) 16 can be substantially equally distributed in the circumferential direction C.

Figure 3:
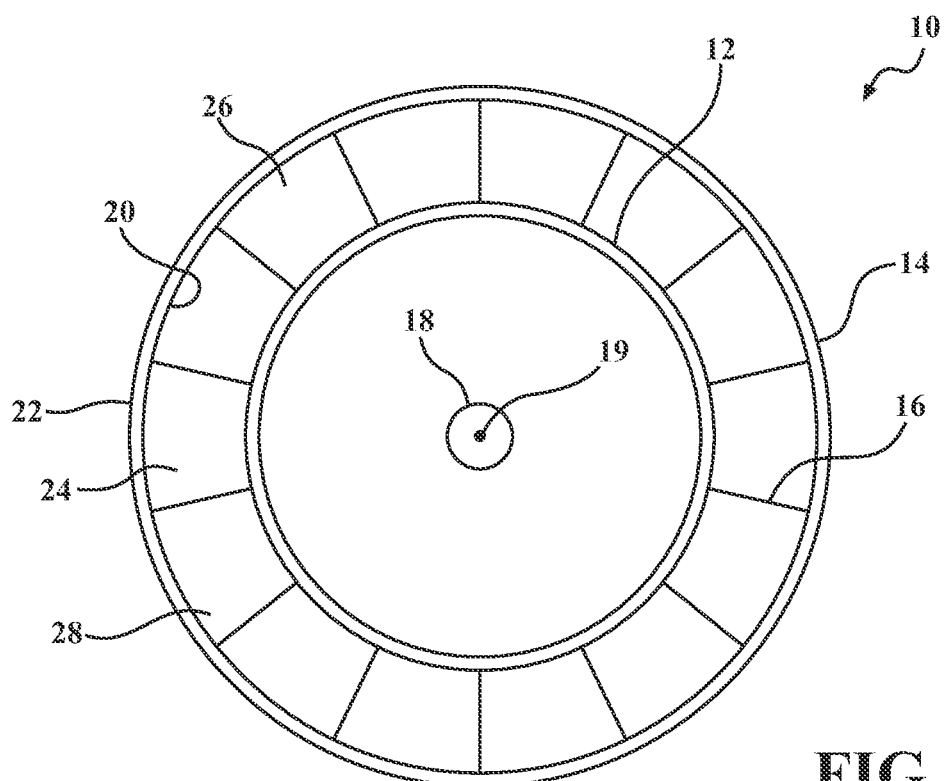
FIG. 3 is an example of an arrangement of a plurality of super elastic wires in a rotating machine system.

In other arrangements, such as is shown in FIG. 3, the rotating machine system 10 can include a plurality of super elastic wires 16. The plurality of super elastic wires 16 can be operatively connected to the rotating machine 12 and to the inner surface 20 in a substantially radial arrangement. In this arrangement, each of the plurality of super elastic wires 16 can be operatively connected to the rotating machine 12 and to the inner surface 20 such that each of the plurality of super elastic wires 16 extends substantially in the radial direction R. In some arrangements, the plurality of super elastic wires 16 can be substantially equally distributed in the circumferential direction C.

As described above in connection with FIGS. 1 and 3, in some arrangements, the super elastic wire(s) 16 can be distributed within the space 24 substantially uniformly in the circumferential direction C. As such, the super elastic wire(s) 16 can be substantially equally spaced. Alternatively, as shown in FIGS. 4 and 5, the super elastic wire(s) 16 can be distributed within the space 24 non-uniformly in the circumferential direction C.

Figure 4:
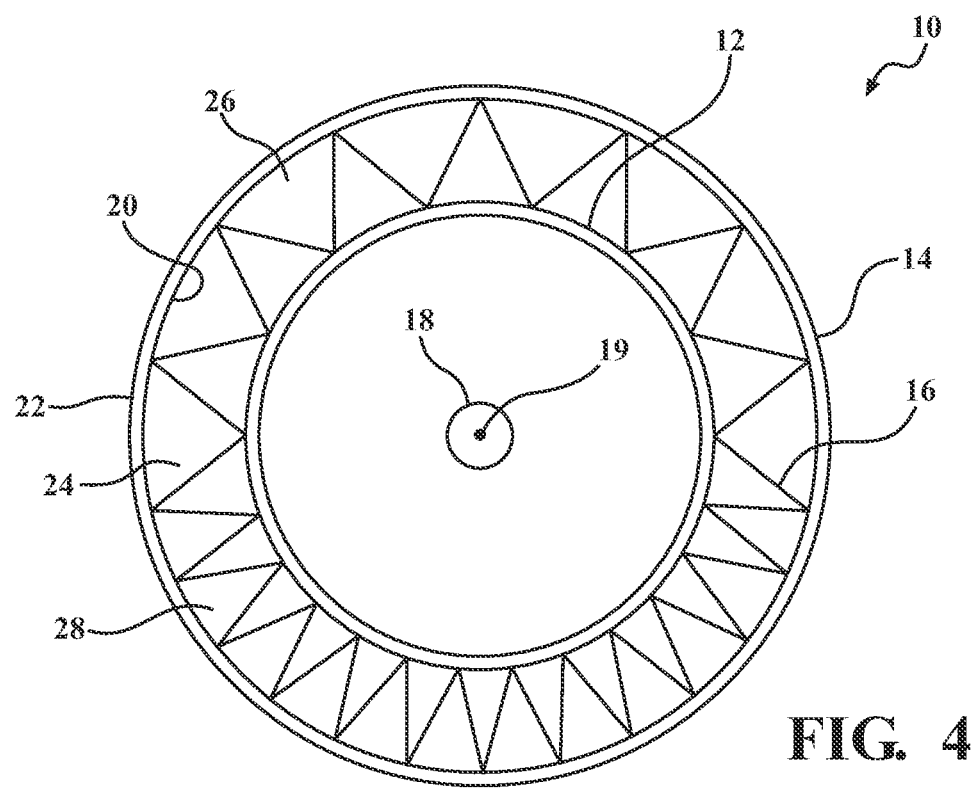
FIG. 4 is an example of an arrangement of one or more super elastic wires in a rotating machine system.

In some examples, such as is shown in FIG. 4, the rotating machine system 10 can include a single super elastic wire 16 arranged in a substantially alternating arrangement, with a greater portion of the single super elastic wire 16 located in the lower region 28 of the space 24 compared to an upper region 26 of the space 24. Alternatively, the rotating machine system 10 can include a plurality of super elastic wires 16 arranged in a substantially alternating arrangement, with a greater portion of the plurality of super elastic wires 16 located in the lower region 28 of the space 24 compared to an upper region 26 of the space 24.

Figure 5:
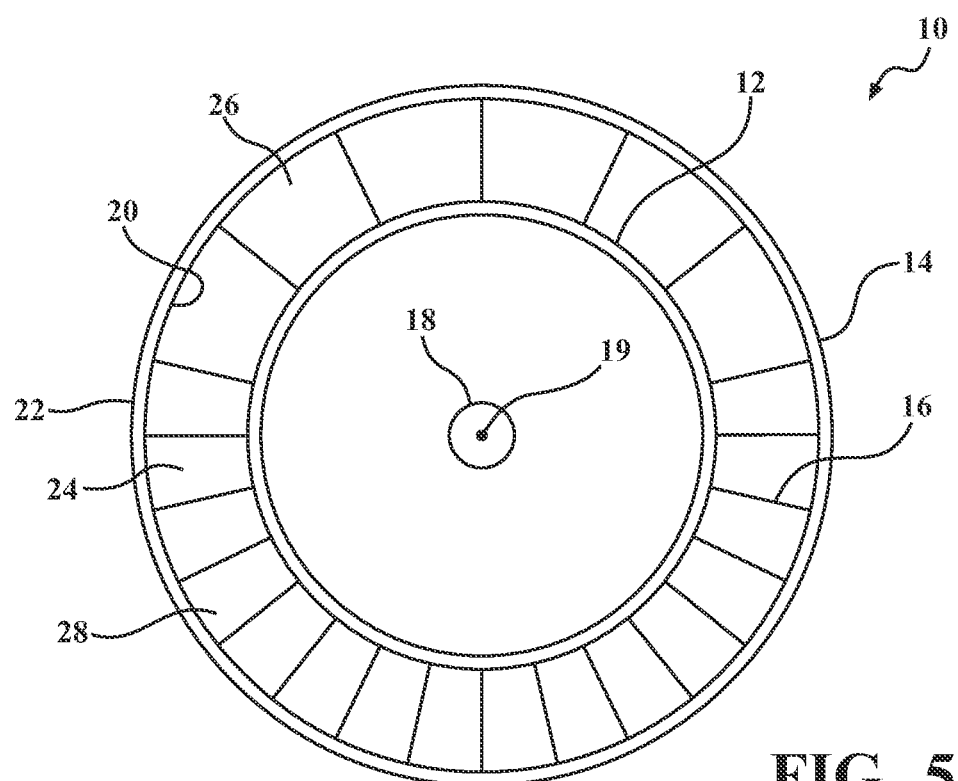
FIG. 5 is an example of an arrangement of a plurality of super elastic wires in a rotating machine system.

In other examples, such as is shown in FIG. 5, the rotating machine system 10 can include a plurality of super elastic wires 16 arranged in a substantially radial arrangement. There can be a greater concentration of the super elastic wires 16 in a lower region 28 of the space 24 compared to an upper region 26 of the space 24. In either or more examples, the distribution of the super elastic wire(s) 16 within the space 24 can vary based on one or more characteristics of the rotating machine 12. For example, a non-uniform arrangement of super elastic wire(s) 16 can be helpful in order to account for the load caused by the weight of the rotating machine 12.

The super elastic wire(s) 16 can be operatively connected to the rotating machine 12 and to the inner surface 20 such that the super elastic wire(s) 16 form a row 38 substantially in the circumferential direction C about the rotating machine 12. The row 38 of super elastic wire(s) 16 can be substantially perpendicular relative to the axial direction A of the rotating machine 12.

Figure 6:
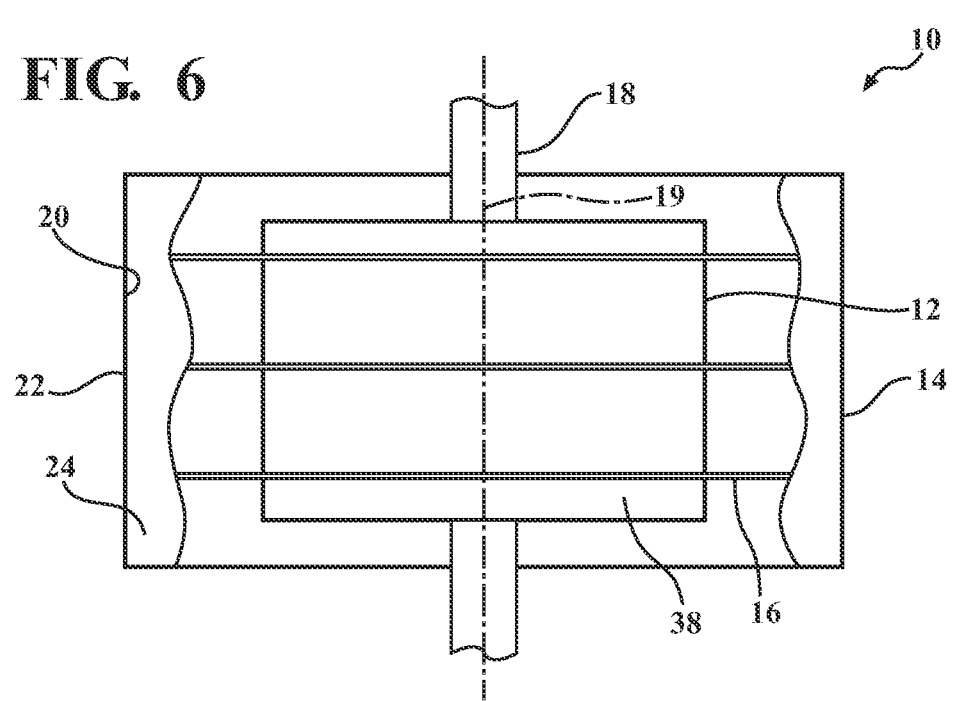
FIG. 6 is a cut-away view of an example of an arrangement of a plurality of rows of super elastic wires in a rotating machine system.
Figure 7:
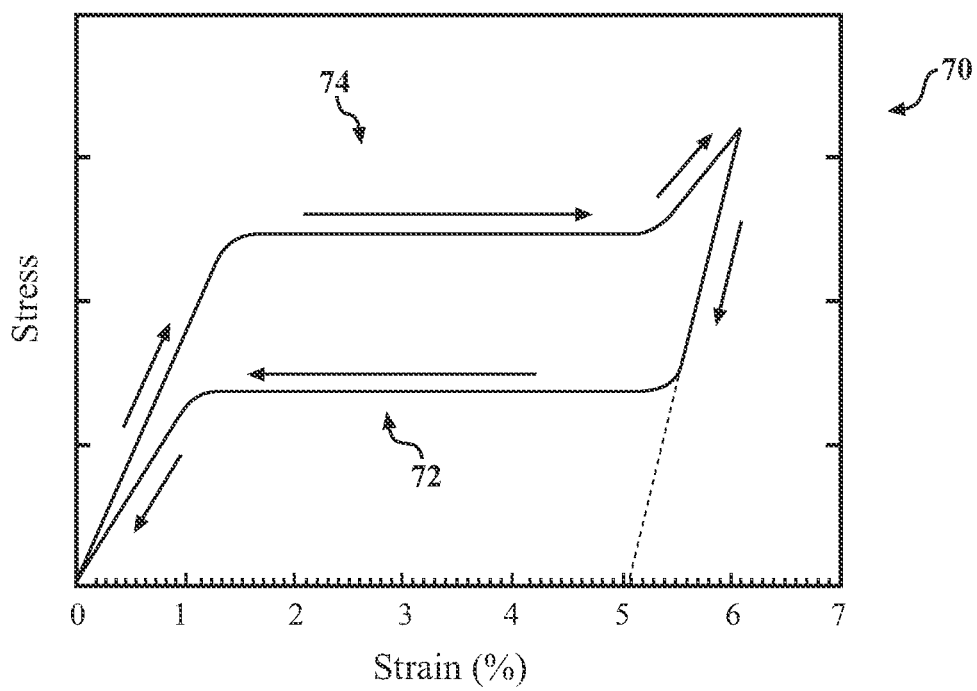
FIG. 7 is an example of a stress-strain curve for super elastic materials.

In some arrangements, the rotating machine system 10 can include a plurality of rows 38 of super elastic wires 16, as shown in FIG. 6. The plurality of rows 38 can be spaced from each other along the axis of rotation 19 or the axial direction A of the rotating machine 12. Each row 38 of the plurality of rows 38 can include super elastic wire(s) 16 arranged in a substantially alternating arrangement, a substantially radial arrangement, or any other suitable arrangement. The super elastic wire(s) 16 in each row can be arranged in a substantially equal distribution or in a non-equal distribution. In some arrangements, the plurality of rows 38 can be substantially equally spaced in the axial direction A. In some arrangements, one or more of the rows 38 can be non-equally spaced from the other rows 38 in the axial direction A.

In some arrangements, the super elastic wire(s) 16 can be operatively connected to the rotating machine 12 and to the inner surface 20 such that the super elastic wire(s) 16 are stretched in tension. As such, the rotating machine 12 can be suspended within the housing 14 by the super elastic wire(s) 16. The tension of the super elastic wire(s) 16 can be varied in any suitable manner. In some examples, the super elastic wire(s) 16 can be pre-stretched before they are operatively connected to the rotating machine 12 and to the inner surface 20. In other examples, the super elastic wire(s) 16 can be operatively connected to the rotating machine 12 and to the inner surface 20 before being stretched. In some examples, the super elastic wire(s) 16 can be stretched, for example, by adjusting the fasteners 30 and//or by manual stretching.

In arrangements including a plurality of super elastic wires 16, each of the plurality of super elastic wires 16 can have a predetermined stiffness. In some examples, each of the plurality of super elastic wires 16 can have substantially the same predetermined stiffness. In other examples, the predetermined stiffness of one or more of the plurality of super elastic wires 16 can be different from the other super elastic wires 16. In some examples, the predetermined stiffness of each of the plurality of super elastic wires 16 can vary based on one or more characteristics of the rotating machine 12. For example, the predetermined stiffness of each of the plurality of super elastic wires 16 can vary to account for the load caused by the weight of the rotating machine 12. In this example, the super elastic wires 16 in a lower region 28 of the space 24 can have a higher predetermined stiffness compared to the super elastic wires 16 in an upper region 26 of the space 24.

The super elastic wire(s) 16 can be made of any suitable super elastic material. One example of a super elastic wire is AdrenaLine™, which is available from Miga Motor Company, Silverton, Oreg. Another example of a super elastic wire is Furukawa Ni—Ti Alloy, which is available from Furukawa Techno Material Co., Ltd., Kanagawa, Japan. In other examples, the super elastic material can be shape memory alloy.

A super elastic material is a material that exhibits two primary properties under certain conditions: superelasticity and quasi-zero stiffness. These properties are depicted in the stress-strain curve 70 shown in FIG. 7. Superelasticity refers to the ability of the super elastic material to substantially regain its original shape when an applied stress, load, and/or force, is removed. For example, the super elastic recovery region 72 of the stress-strain curve 70 shows the super elastic material returning to a zero-stress state after unloading of an applied stress. Quasi-zero stiffness refers to a region of the stress-strain curve 70 for super elastic materials that is substantially flat. In the quasi-zero stiffness region 74 of the stress-strain curve 70, the stiffness becomes very low (for example, zero or substantially zero), which allows for good vibration isolation. When the super elastic wire(s) 16 operate in the quasi-zero stiffness region 74, the transfer of vibrations from the rotating machine 12 to the housing 14 is substantially reduced. In this way, the super elastic wire(s) 16 can act as vibration isolators. The super elastic material would exhibit a similar profile on a force-deflection curve. In the quasi-zero stiffness region, the force-deflection curve can become substantially flat.

While the super elastic material is described herein as being a wire, it will be understood that the super elastic material is not limited to being a wire. In other examples, the super elastic material can take the form of cables, tubes, and/or other structures, just to name a few examples. Additionally or alternatively, the super elastic material may include an insulated coating.

It will be appreciated that the arrangements described herein can provide numerous benefits, including one or more of the benefits mentioned herein. For example, the arrangements described herein can reduce vibrations within a rotating machine and stabilize the rotating machine within the housing. The arrangements described herein can also improve the rate of wear of the rotating machine and the operability of the rotating machine. Moreover, the arrangements described herein can also reduce the occurrence of mechanical failures within the rotating machine.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . ," as used herein refers to and encompasses any and all possible combinations of one or more of the associated listed items. As an example, the phrase "at least one of A, B, and C" includes A only, B only, C only, or any combination thereof (e.g. AB, AC, BC, or ABC). As used herein, the term "substantially" or "about" includes exactly the term it modifies and slight variations therefrom. Thus, the term "substantially parallel" means exactly parallel and slight variations therefrom. "Slight variations therefrom" can include within 15 degrees/percent/units or less, within 14 degrees/percent/units or less, within 13 degrees/percent/units or less, within 12 degrees/percent/units or less, within 11 degrees/percent/units or less, within 10 degrees/percent/units or less, within 9 degrees/percent/units or less, within 8 degrees/percent/units or less, within 7 degrees/percent/units or less, within 6 degrees/percent/units or less, within 5 degrees/percent/units or less, within 4 degrees/percent/units or less, within 3 degrees/percent/units or less, within 2 degrees/percent/units or less, or within 1 degree/percent/unit or less. In some examples, "substantially" can include being within normal manufacturing tolerances.

Aspects herein can be embodied in other forms without departing from the spirit or essential attributes thereof. Accordingly, reference should be made to the following claims, rather than to the foregoing specification, as indicating the scope of the invention.

What is claimed is:

1. A rotating machine system comprising:
    a rotating machine;
    a housing including an inner surface, the housing surrounding at least a portion of the rotating machine, the inner surface of the housing being spaced from the rotating machine such that a space is defined therebetween; and
    one or more super elastic wires having a stiffness profile including a quasi-zero stiffness region, the one or more super elastic wires being positioned in the space and being operatively connected to the rotating machine and to the inner surface of the housing.

2. The rotating machine system of claim 1, wherein the one or more super elastic wires are connected to at least one of the rotating machine and the inner surface of the housing by one or more fasteners.

3. The rotating machine system of claim 1, wherein the one or more super elastic wires are stretched to a quasi-zero stiffness regime.

4. The rotating machine system of claim 1, wherein the one or more super elastic wires are operatively connected in tension between the rotating machine and the housing.

5. The rotating machine system of claim 1, wherein the one or more super elastic wires are arranged in a row in a circumferential direction about the rotating machine.

6. The rotating machine system of claim 1, wherein the one or more super elastic wires is a plurality of super elastic wires, and wherein the plurality of super elastic wires are arranged substantially radially relative to an axis of rotation of the rotating machine.

7. The rotating machine system of claim 1, wherein the one or more super elastic wires is a plurality of super elastic wires, wherein the plurality of super elastic wires are arranged in a plurality of rows, and wherein the plurality of rows are spaced from each other along an axis of rotation of the rotating machine.

8. The rotating machine system of claim 1, wherein the one or more super elastic wires are arranged in an alternating arrangement in a circumferential direction about the rotating machine.

9. The rotating machine system of claim 1, wherein the one or more super elastic wires are distributed non-uniformly in a circumferential direction about the rotating machine.

10. The rotating machine system of claim 9, wherein the one or more super elastic wires are distributed with a greater concentration in a lower region of the space than in an upper region of the space.

11. The rotating machine system of claim 1, wherein the rotating machine is suspended in the housing by the one or more super elastic wires.

12. A rotating machine system, comprising:
    a rotating machine;
    a housing including an inner surface, the housing surrounding at least a portion of the rotating machine, the inner surface of the housing being spaced from the rotating machine such that a space is defined therebetween; and
    one or more super elastic wires having a stiffness profile including a quasi-zero stiffness region, the one or more super elastic wires being positioned in the space and being operatively connected in tension to the rotating machine and to the inner surface of the housing and being stretched to a quasi-zero stiffness regime.

13. The rotating machine system of claim 12, wherein the one or more super elastic wires are connected to at least one of the rotating machine and the inner surface of the housing by one or more fasteners.

14. The rotating machine system of claim 12, wherein the one or more super elastic wires are arranged in a row in a circumferential direction about the rotating machine.

15. The rotating machine system of claim 12, wherein the one or more super elastic wires is a plurality of super elastic wires, and wherein the plurality of super elastic wires are arranged substantially radially relative to an axis of rotation of the rotating machine.

16. The rotating machine system of claim 12, wherein the one or more super elastic wires is a plurality of super elastic wires, wherein the plurality of super elastic wires are arranged in a plurality of rows, and wherein the plurality of rows are spaced from each other along an axis of rotation of the rotating machine.

17. The rotating machine system of claim 12, wherein the one or more super elastic wires are arranged in an alternating arrangement in a circumferential direction about the rotating machine.

18. The rotating machine system of claim 12, wherein the one or more super elastic wires are distributed non-uniformly in a circumferential direction about the rotating machine.

19. The rotating machine system of claim 18, wherein the one or more super elastic wires are distributed with a greater concentration in a lower region of the space between the rotating machine and the housing than in an upper region of the space between the rotating machine and the housing.

20. The rotating machine system of claim 12, wherein the rotating machine is suspended in the housing by the one or more super elastic wires.

* * * * *